United States Patent [19]

Terashima et al.

[11] Patent Number: 5,116,529
[45] Date of Patent: * May 26, 1992

[54] FERROELECTRIC LIQUID CRYSTAL COMPOSITION AND LIQUID CRYSTAL DISPLAY ELEMENT

[75] Inventors: Kanetsugu Terashima, Chiba; Mitsuyoshi Ichihashi, Fukuoka; Makoto Kikuchi; Fusayuki Takeshita, both of Chiba; Kenji Furukawa, Kanagawa, all of Japan

[73] Assignee: Chisso Corporation, Japan

[*] Notice: The portion of the term of this patent subsequent to Jan. 9, 2007 has been disclaimed.

[21] Appl. No.: 442,517

[22] Filed: Nov. 28, 1989

[30] Foreign Application Priority Data

Nov. 28, 1988 [JP] Japan .............. 63-298156

[51] Int. Cl.$^5$ .................. C09K 19/34; C09K 19/52; C09K 19/30; C09K 19/12
[52] U.S. Cl. .................. 252/299.61; 252/299.01; 252/299.63; 252/299.65; 252/299.66
[58] Field of Search ............. 252/299.01, 299.61, 252/299.65, 299.66, 299.63

[56] References Cited

U.S. PATENT DOCUMENTS

| | | | |
|---|---|---|---|
| 4,795,587 | 1/1989 | Ohno et al. | 252/299.61 |
| 4,882,083 | 11/1989 | Terashima et al. | 252/299.61 |
| 4,882,084 | 11/1989 | Ohno et al. | 252/299.66 |
| 4,892,393 | 1/1990 | Terashima et al. | 252/299.01 |
| 4,906,400 | 3/1990 | Saito et al. | 252/299.61 |
| 4,931,208 | 6/1990 | Furukawa et al. | 252/299.61 |
| 4,952,335 | 8/1990 | Furukawa et al. | 252/299.61 |
| 4,961,875 | 10/1990 | Ohno et al. | 252/299.66 |
| 4,973,426 | 11/1990 | Ohno et al. | 252/299.61 |
| 4,985,172 | 1/1991 | Wingen et al. | 252/299.61 |

FOREIGN PATENT DOCUMENTS 0255219 2/1988 European Pat. Off. ........ 252/299.66
0318028 5/1989 European Pat. Off. .
8705018 8/1987 World Int. Prop. O. ...... 252/299.61

OTHER PUBLICATIONS

Bone et al., "Synthesis and Physical Evaluation of Novel Ferroelectric Materials with High Spontaneous Polarization", Molecular Crystals & Liquid Crystal, Nov. 1988, pp. 117–134.

*Primary Examiner*—Robert L. Stoll
*Assistant Examiner*—Philip Tucker
*Attorney, Agent, or Firm*—Leydig, Voit & Mayer

[57] ABSTRACT

The present invention is directed to a ferroelectric liquid crystal composition having quick response properties and assuming a smectic C* phase in an extensive temperature range inclusive of room temperature, and an optical switching element having a quick response property containing this composition.

The ferroelectric liquid crystal composition is here disclosed which comprises at least one chiral compound (liquid crystal component A) having an optical activity site represented by the formula (A)

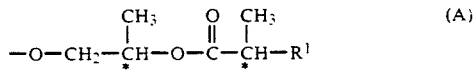

wherein $R^1$ is a straight-chain or branched alkyl group having 2 to 18 carbon atoms or a straight-chain or branched alkoxy group having 1 to 18 carbon atoms, and * indicates an asymmetric carbon atom, and at least one non-chiral compound (liquid crystal component B) having a smectic C phase (hereinafter referred to as "$S_C$ phase"; which shall apply in the following), an $S_I$ phase, an $S_F$ phase, an $S_G$ phase, an $S_H$ phase, an $S_J$ phase or an $S_K$ phase.

4 Claims, No Drawings

FERROELECTRIC LIQUID CRYSTAL COMPOSITION AND LIQUID CRYSTAL DISPLAY ELEMENT

BACKGROUND OF THE INVENTION (1) Field of the Invention

The present invention relates to a ferroelectric liquid crystal material. More specifically, it relates to a ferroelectric liquid crystal composition having quick response properties which comprises a smectic liquid crystal compound and an optically active compound, and an optical switching element which contains this composition.

(2) Description of the Prior Art

Liquid crystal compounds are widely used as materials for display elements, and most of these liquid crystal elements are on TN type display system and liquid crystal materials are in the state of nematic phase.

The TN type display system has advantages such as less tiredness of eyes and extremely small consumption of electric power because of non-emissive type, whereas it has disadvantages such as slow response and disappearance of display at Certain viewing angles. In recent years, this system is being improved in such a direction as to keep up characteristics of flat displays, and in particular, the quick response and the enlargement of viewing angle are demanded.

In order to meet these demands, improvements in liquid crystal materials have been attempted. However, as compared with other non-emissive type displays (e.g., electroluminescence displays and plasma displays), it is apparent that the TN type display system is much poorer in points of response time and the extent of viewing angle.

In order that characteristics of the liquid crystal display element, such as features of the non-emissive type and small consumption of electric power may be maintained and in order that quick response corresponding to that of the non-emissive type displays may be assured, it is essential to develop a novel liquid display system in place of the TM type display system. As one of such attempts, a display system in which the optical switching phenomenon of ferroelectric liquid crystals is utilized has been suggested by N. A. Clark and S. T. Lagerwall (see Appl. Phys. Lett.,36, P 899, 1980).

The presence of the ferroelectric liquid crystals has been announced for the first time in 1975 by R. B. Mayer et al. (see J. de Phys., 36, P 69, 1975), and from the viewpoint of structure, these liquid crystals belong to a chiral smectic C phase, a chiral smectic I phase, a chiral smectic F phase, a chiral smectic G phase and a chiral smectic H phase (hereinafter referred to simply as "$S_C^*$ phase", "$S_I^*$ phase", "$S_F^*$ phase", "$S_G^*$ phase" and "$S_H^*$ phase", respectively). In the chiral smectic phase, molecules form a layer and incline to the surface of the layer, and a helical axis is vertical to this layer surface.

In the chiral smectic phase, spontaneous polarization takes place, and therefore, when DC electric field is applied to this layer in parallel therewith, the molecules turn round the helical axis in accordance with its polarity. The display element of the ferroelectric liquid crystals utilizes this switching phenomenon.

Nowadays, of the chiral smectic phases, much attention is particularly paid to the $S_C^*$ phase. The display system in which switching phenomenon of the $S_C^*$ phase is utilized can be further classified into two types: a birefringence type system using two polarizers and a guest/host type system using a dichoric dye.

Features of these display systems are:

(1) Response time is very short.

(2) Memory properties are present.

(3) Display performance is not so affected by viewing angle.

Thus, the display systems have the possibility of achieving a high-density display and are considered to be effectively utilizable in the display element. However, also in these display systems, there are now many problems to be solved.

For example, (1) No compounds are not present which assume the $S_C^*$ phase which can be stably operated at room temperature.

(2) The helical pitch is short.

(3) The achievement of alignment is very difficult.

(4) Spontaneous polarization is small, and response time is long.

Therefore, typical requirements for the ferroelectric liquid crystal material are as follows:

(1) The $S_C^*$ phase should be stable in an extensive temperature range inclusive of room temperature.

(2) The helical pitch should be long.

(3) The spontaneous polarization should be large.

At present, any chiral smectic liquid crystal compounds in a single state which satisfy the requirements are not present, and thus one attempt is to provide a ferroelectric liquid crystal composition which satisfies the above-mentioned requirements comprising several chiral smectic liquid crystal compounds which can meet a part of the above-mentioned requirements, or non-liquid crystal compounds after mixing these several compounds and repeating by a trial and error method.

In addition to the ferroelectric liquid crystal composition comprising the ferroelectric liquid crystal compound alone, Japanese Patent Laid-Open Publication No. 195,187/1986 discloses a ferroelectric liquid crystal composition which can be prepared by mixing one or more compounds assuming a ferroelectric liquid crystal phase with fundamental materials of compounds and compositions assuming non-chiral smectic C, F, G, H and I phases (hereinafter referred to simply as "$S_C$ and other phases"). Furthermore, another ferroelectric liquid crystal composition is also reported in which one or more compounds having optical activity but not assuming any ferroelectric liquid crystal phase are mixed with fundamental materials of compounds and compositions assuming the $S_C$ and other phases (Mol. Cryst. Liq. Cryst., 89, p 327, 1982).

From these reports, it is definite that the ferro-electric liquid crystal composition can be prepared by mixing one or more compounds having optical activity with fundamental materials irrespective of whether or not the compounds to be mixed assume the ferroelectric liquid crystal phase.

The above-mentioned smectic liquid crystal mixture which comprises the fundamental material assuming at least one of the non-chiral $S_C$ and other phases and which assumes at least one of the $S_C$ and other phases will be hereinafter referred to as the base $S_m$ mixture.

The base $S_m$ mixture preferred in practice is a liquid crystal mixture assuming the $S_C$ phase in an extensive temperature range inclusive of room temperature. Components of the base $S_m$ mixture, are suitably selected from liquid crystal compounds such as phenylbenzole series, Schiff base series, phenylpyridine series and 5-alkyl-2-(4-alkoxypheny)-pyrimidine.

For example, in Japanese Patent Laid-Open Publication No. 291,679/1986 and the pamphlet of PCT International Publication W086/06401, the ferroelectric liquid crystal prepared by mixing 5-alkyl-2-(4-alkoxyphenyl)pyrimidine with an optically active compound can assume the $S_C^*$ phase in a wide temperature range inclusive of room temperature, and in the former publication, it is also described that when an optical switching element contains the ferroelectric smectic liquid crystal material in which the above-mentioned pyrimidine derivative is used as the base $S_m$ mixture, the thus made switching element can have a shortened response time. Furthermore, in Japanese Patent Laid-Open Publication No. 291,679/1986, it is disclosed that the ferroelectric liquid crystal material comprising 5-alkyl-2-4'-alkylbiphenylyl)pyrimidine, 5-alkyl-2-(4-alkoxyphenyl)pyrimidine and an optically active compound also assumes the $S_C^*$ phase in an extensive temperature range including room temperature, and that it is effective for the improvement of the response time.

However, at present, the response times of the ferroelectric liquid crystal compositions in Japanese Patent Laid-open Publication No. 291,679/1986 and the pamphlet of PCT International Publication W086/06401 are still longer (300 to 500 μsec) as compared with other type display elements such as the presently used light emission type displays, and thus the improvement of the response properties are further demanded.

Also as for helical pitch, some improvements have been made. The ferroelectric liquid crystal material having the long helical pitch can be obtained by mixing a chiral smectic liquid crystal compound in which a helical twist direction is right-handed with a chiral smectic liquid crystal compound in which the helix is left-handed, or mixing a compound having the $S_C$ phase with a chiral smectic liquid crystal compound (Japanese Patent Laid-open Publication Nos. 90,290/1985 and 195,187/1986).

SUMMARY OF THE INVENTION

A first object of the present invention is to provide a ferroelectric liquid crystal composition having quick response time and assuming an $S_C^*$ phase in an extensive temperature range inclusive of room temperature, and a second object of the present invention is to provide an optical switching element made from this liquid crystal composition and having a quick response time.

The first feature of the present invention is directed to a ferroelectric liquid crystal composition comprising at least one chiral compound having an optical activity site represented by the formula (A)

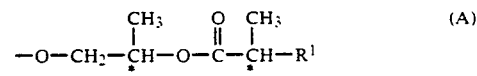

wherein $R^1$ is a straight-chain or branched alkyl group having 2 to 18 carbon atoms or a straight-chain or branched alkoxy group having 1 to 18 carbon atoms, and * indicates an asymmetric carbon atom, and at least one non-chiral compound having any phase of a smectic C phase, a smectic I phase, a smectic F phase, a smectic G phase, a smectic H phase, a smectic J phase or a smectic K phase.

The second feature of the present invention is directed to a ferroelectric liquid crystal composition comprising at least one chiral compound having an optical activity site represented by the formula (B)

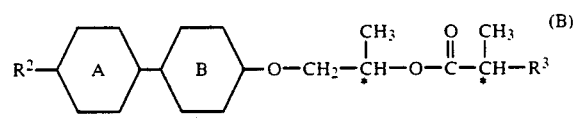

wherein $R^2$ is a straight-chain or branched alkyl group or alkoxy group having 1 to 18 carbon atoms, $R^3$ is a straight-chain or branched alkyl group having 2 to 18 carbon atoms or an alkoxy group having 1 to 18 carbon atoms, each of

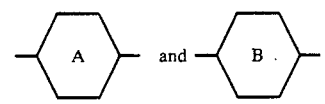

is independently

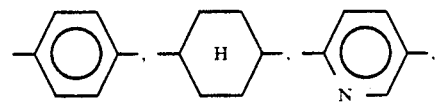

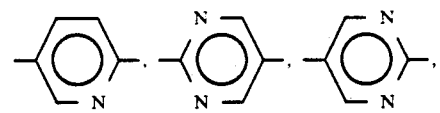

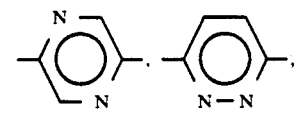

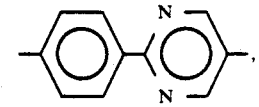

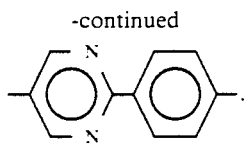

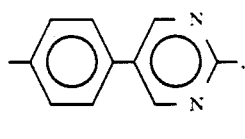

and * indicates an asymmetric carbon atom, and at least one non-chiral compound having any phase of a smectic C phase, a smectic I phase, a smectic F phase, a smectic G phase, a smectic H phase, a smectic J phase or a smectic K phase, this non-chiral compound being represented by the formula (C)

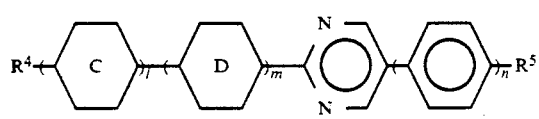

wherein each of

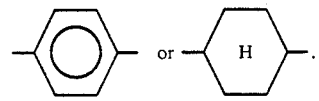

is independently

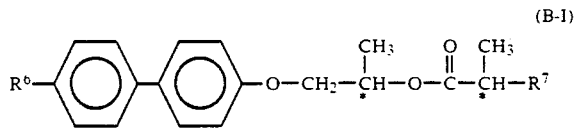

$R^4$ and $R^5$ are identical or different and each of them is a straight-chain or branched alkyl group, alkoxy group or alkanoyloxy group having 1 to 18 carbon atoms, and each of (, m and n is 0 or 1.

Furthermore, the third feature of the present invention is directed to a ferroelectric liquid crystal composition comprising at least three undermentioned liquid crystal components A, B and C, the proportions of these components being 5 to 40% by weight of A, 20 to 75% by weight of B and 5 to 35% by weight of C with respect to the total weight of the three components. Here, the liquid crystal component A comprises one or more compound selected from the group consisting of compounds represented by the following formulae (B-I), (B-II), (B-III), (B-IV) and (B-V):

the formula (B-I):

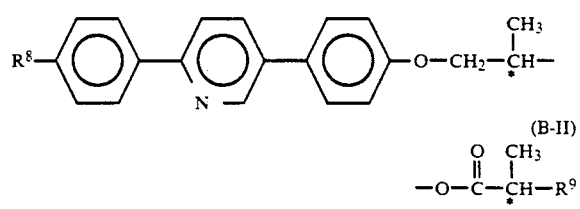

wherein $R^6$ is a straight-chain or branched alkyl group or alkoxy group having 1 to 18 carbon atoms, $R^7$ is a straight-chain or branched alkyl group having 2 to 18 carbon atoms or a straight-chain or branched alkoxy group having 1 to 18 carbon atoms, and * indicates an asymmetric carbon atom, the formula (B-II):

wherein $R^8$ is a straight-chain or branched alkyl group or alkoxy group having 1 to 18 carbon atoms, $R^9$ is a straight-chain or branched alkyl group having 2 to 18 carbon atoms or a straight-chain or branched alkoxy group having 1 to 18 carbon atoms, and * indicates an asymmetric carbon atom, the formula (B-III):

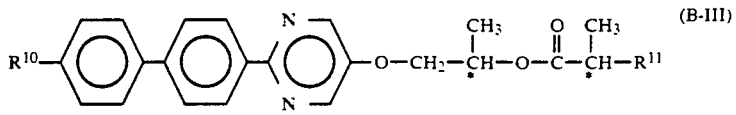

wherein $R^{10}$ is a straight-chain or branched alkyl group or alkoxy group having 1 to 18 carbon atoms, $R^{11}$ is a straight-chain or branched alkyl group having 2 to 18 carbon atoms or a straight-chain or branched alkoxy group having 1 to 18 carbon atoms, and * indicates an asymmetric carbon atom, the formula (B-IV):

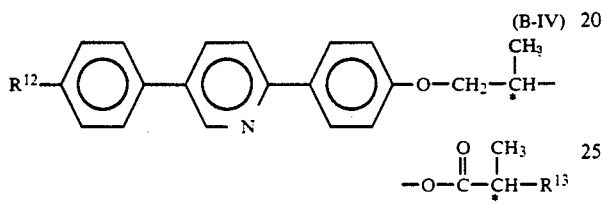

wherein $R^{12}$ is a straight-chain or branched alkyl group or alkoxy group having 1 to 18 carbon atoms, $R^{13}$ is a straight-chain or branched alkyl group having 2 to 18 carbon atoms or a straight-chain or branched alkoxy group having 1 to 18 carbon atoms, and * indicates an asymmetric carbon atom, and the formula (B-V):

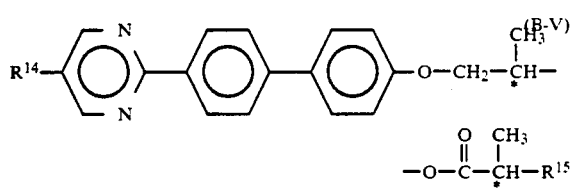

wherein $R^{14}$ is a straight-chain or branched alkyl group or alkoxy group having 1 to 18 carbon atoms, $R^{15}$ is a straight-chain or branched alkyl group having 2 to 18 carbon atoms or a straight-chain or branched alkoxy group having 1 to 18 carbon atoms, and * indicates an asymmetric carbon atom.

The above-mentioned liquid crystal component B comprises one or more selected from the group consisting of compounds represented by the following formulae (C-VI), (C-VII), (VIII) and (IX);

the formula (C-VI):

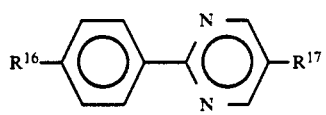

wherein $R^{16}$ and $R^{17}$ are identical or different and each of them is a straight-chain or branched alkyl group or alkoxy group having 1 to 18 carbon atoms, the formula (C-VII):

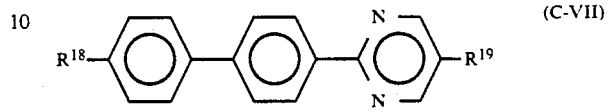

wherein $R^{18}$ and $R^{19}$ are identical or different and each of them is a straight-chain or branched alkyl group or alkoxy group having 1 to 18 carbon atoms, the formula (VIII):

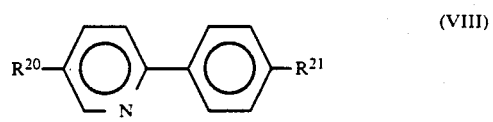

wherein $R^{20}$ and $R^{21}$ are identical or different and each of them is a straight-chain or branched alkyl group or alkoxy group having 1 to 18 carbon atoms, and the formula (IX):

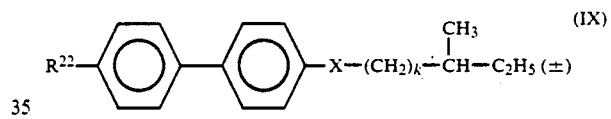

wherein $R^{22}$ is a straight-chain or branched alkyl group or alkoxy group having 1 to 18 carbon atoms, X is absence or a single bond or —O—, k is a value of from 0 to 10, and (±) indicates a racemic compound.

The above-mentioned liquid crystal component C comprises one or more compounds selected from the group consisting of compounds represented by the formula (X)

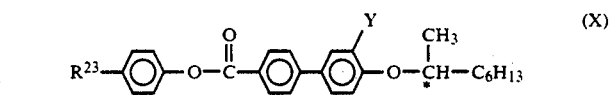

wherein $R^{23}$ is a straight-chain or branched alkyl group or alkoxy group having 1 to 18 carbon atoms, Y is —H, —F or —CN, and * indicates an asymmetric carbon atom.

The fourth feature of the present invention is directed to a ferroelectric liquid crystal composition comprising at least three liquid crystal components A, B and C of the third feature of the present invention and a fourth component, i.e., the following liquid crystal component D, a ratio of the component D being 5 to 25% by weight with respect to the total weight of the three components A, B and C. Here, the liquid crystal component D comprises one or more selected from the group consisting of compounds represented by the following formulae (XI), (XII), (XIII), (XIV) and (XV)

the formula (XI):

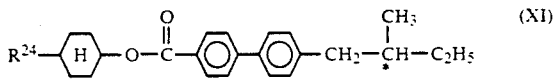

wherein $R^{24}$ is a straight-chain or branched alkyl group having 1 to 18 carbon atoms, and * indicates an asymmetric carbon atom, the formula (XII):

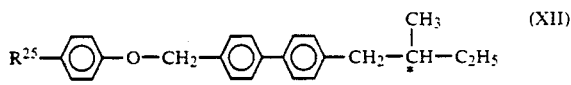

wherein $R^{25}$ is a straight-chain or branched alkyl group or alkoxy group having 1 to 18 carbon atoms, and * indicates an asymmetric carbon atom, the formula (XIII):

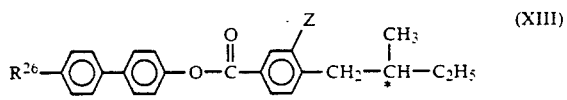

wherein $R^{26}$ is a straight-chain or branched alkyl group or alkoxy group having 1 to 18 carbon atoms, Z is —H, —F or —CN, and * indicates an asymmetric carbon atom, the formula (XIV):

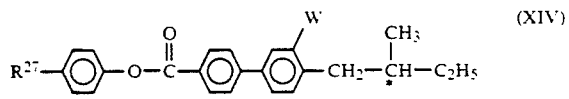

wherein $R^{27}$ is a straight-chain or branched alkyl group or alkoxy group having 1 to 18 carbon atoms, W is —H, —F or —CN, and * indicates an asymmetric carbon atom, and the formula (XV):

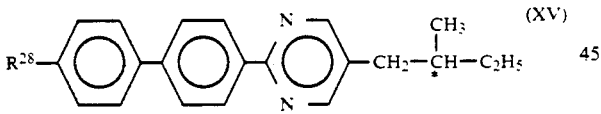

wherein $R^{28}$ is a straight-chain or branched alkyl group or alkoxy group having 1 to 18 carbon atoms, and * indicates an asymmetric carbon atom.

The fifth feature of the present invention is directed to an optical switching element made from the ferroelectric liquid crystal composition of the above-mentioned first, second, third or fourth feature of the present invention.

DETAILED DESCRIPTION OF THE INVENTION

Inventors of the present application have intensively performed research with the intention of further improving an invention disclosed in Japanese Patent Laid-open Publication No. 291,679/1986. As a result, we have found that a ferroelectrical liquid crystal composition having quick response time and assuming an $S_C^*$ phase in a wide temperature range inclusive of room temperature can be obtained by combining liquid crystal compounds with each other as described hereinafter, and the present invention has been achieved on the basis of this knowledge.

A chiral compound having an optical activity site represented by the formula (A)

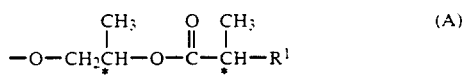

used in the present invention is characterized by the fact that a carbonyloxy group having a high dipole moment is present next to an asymmetric carbon atom, as described hereinafter. Therefore, this kind of chiral compound has a very great spontaneous polarization value and a quick response ability. Typical examples of the chiral compounds of the present invention are compounds represented by the formula

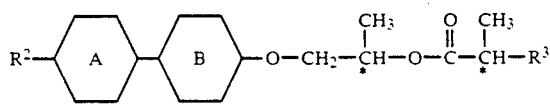

and more specifically, other examples of the chiral compound include compounds represented by the formulae (B-I) to (B-V) which are enumerated in the patent applications (Japanese Patent Application Nos. 49796/1987 and 103977/1987) Needless to say, in the ferroelectric liquid crystal composition of the present invention, compounds each having an optical activity site which are represented by the formula (A) can be also used in addition to the compounds represented by the formula (B).

Examples of the compounds each having an optical activity site include compounds having bonding groups such as

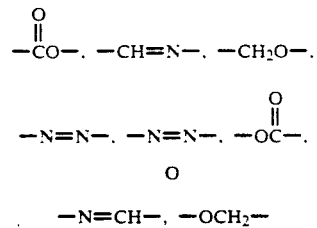

of the formula (B). That is, the compound having any skeletal structure can be used as a constitutional component of the ferroelectric liquid crystal composition regarding the present invention, so long as it is the chiral compound having an optical activity site which is represented by the formula (A).

Typical examples of the compound represented by the formula (B) are set forth in Tables 1 to 9 mentioned below. In the formula (A), the absolute configuration of the asymmetric carbon atom may be either R type or S type.

TABLE 1

Compounds represented by

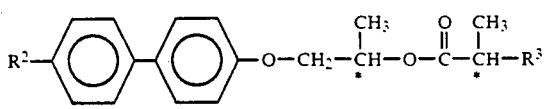

| $R^2$ | $R^3$ | Absolute Configuration |
|---|---|---|
| $C_8H_{17}O-$ | $-C_2H_5$ | S. S |
| " | $-OC_3H_7$ | " |
| $C_8H_{17}O-$ | $-OC_4H_9$ | S. R |
| " | " | S. S |

TABLE 4

Compounds represented by

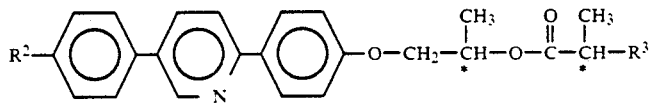

| $R^2$ | $R^3$ | Absolute Configuration |
|---|---|---|
| $C_4H_9-$ | $-OC_4H_9$ | S. S |

TABLE 2

Compounds represented by

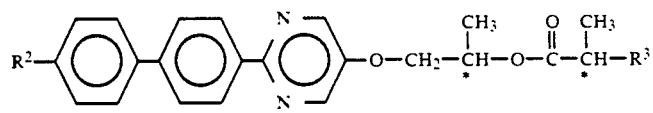

| $R^2$ | $R^3$ | Absolute Configuration |
|---|---|---|
| $C_3H_7-$ | $-OC_4H_9$ | S. S |
| " | $-OC_6H_{13}$ | " |
| $C_5H_{11}-$ | $-OC_4H_9$ | S. R |
| " | " | S. S |
| $C_6H_{13}-$ | " | S. S |
| $C_6H_{13}-$ | $-OC_5H_{11}$ | S. S |
| " | $-OC_6H_{13}$ | " |
| $C_7H_{15}-$ | $-OC_4H_9$ | " |
| $C_6H_{13}O-$ | " | " |
| " | $-OC_6H_{13}$ | " |

TABLE 3

Compounds represented by

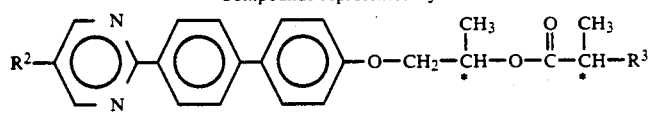

| $R^2$ | $R^3$ | Absolute Configuration |
|---|---|---|
| $C_6H_{13}-$ | $-OC_4H_9$ | S. S |
| $C_8H_{17}-$ | $-OC_4H_9$ | S. S |

TABLE 5

Compounds represented by

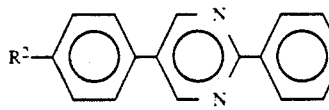

| R² | R³ | Absolute Configuration |
|---|---|---|
| C₄H₉— | —OC₄H₉ | S. S |

TABLE 6

Compound represented by

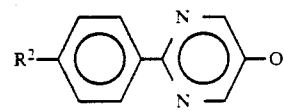

| R² | R³ | Absolute Configuration |
|---|---|---|
| C₅H₁₁— | —OC₄H₉ | S. S |

TABLE 8

Compounds represented by

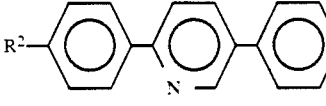

| R² | R³ | Absolute Configuration |
|---|---|---|
| C₇H₁₅O— | —OC₃H₇ | S. R |
| " | —OC₄H₉ | S. S |
| C₇H₁₅O— | —C₂H₅ | S. S |

TABLE 7

Compound represented by

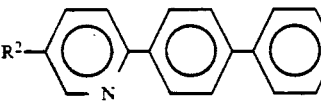

| R² | R³ | Absolute Configuration |
|---|---|---|
| C₇H₁₅— | —OC₃H₇ | R. S |

TABLE 9

Compounds represented by

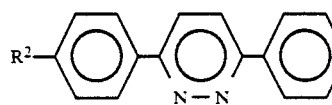

| R² | R³ | Absolute Configuration |
|---|---|---|
| C₃H₇— | —OC₃H₇ | S. S |

TABLE 9-continued

| C₃H₇— | —C₂H₅ | S. S |
|---|---|---|

On the other hand, the non-chiral compound having any of an $S_C$ phase, an $S_I$ phase, an $S_F$ phase, an $S_G$ phase, an $S_H$ phase and an $S_K$ phase is assumed as a base $S_m$ compound in the present invention, and therefore it is preferred that the non-chiral compound assumes the $S_C$ phase or the like in an extensive temperature range inclusive of room temperature.

Typical examples of such non-chiral compounds include pyrimidine compounds represented by the formula (C)

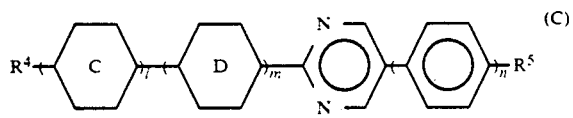

(C)

as well as phenylpyrimidine compounds represented by the formula (C-VI) and (C-VII). However, in the ferroelectric liquid crystal composition of the present invention, other compounds which are not represented by the formula (C) can be also used as constitutional components in such an amount as not to impede the object of the present invention, so long as they have the $S_C$ phase or the like. Examples of such non-chiral compounds include biphenylylbenzoate series, biphenylylcyclchexane series, azo series, azoxy series, phenylpyridine series and biphenyl series liquid crystal compounds which are rich in the $S_C$ properties.

Of the non-chiral compounds represented by the formula (C), their typical examples which can assume the $S_C$ phase and the like are set forth in Tables 10 to 12.

TABLE 10

Compounds represented by

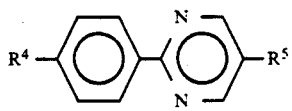

| R⁴ | R⁵ | R⁴ | R⁵ |
|---|---|---|---|
| C₆H₁₃O— | C₈H₁₇— | C₇H₁₅O— | C₉H₁₉— |
| " | C₉H₁₉— | " | C₁₀H₂₁— |
| " | C₁₀H₂₁— | " | C₁₁H₂₃— |
| " | C₁₁H₂₃— | C₈H₁₇O— | C₈H₁₇— |
| C₈H₁₇O— | C₉H₁₉— | C₁₂H₂₅O— | C₇H₁₅— |
| " | C₁₀H₂₁— | " | C₈H₁₇— |
| " | C₁₁H₂₃— | C₅H₁₁COO— | C₈H₁₇— |
| C₉H₁₉O— | C₇H₁₅— | C₆H₁₃COO— | " |
| " | C₈H₁₇— | C₇H₁₅COO— | " |
| " | C₉H₁₉— | C₈H₁₇COO— | " |
| " | C₁₀H₂₁— | C₉H₁₉COO— | " |
| C₁₀H₂₁O— | C₈H₁₇— | C₁₀H₂₁COO— | " |

TABLE 10-continued

Compounds represented by

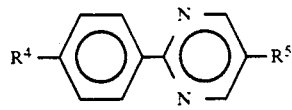

| R⁴ | R⁵ | R⁴ | R⁵ |
|---|---|---|---|
| C₁₁H₂₃O— | C₇H₁₅— | C₁₁H₂₃COO— | " |
| " | C₈H₁₇— | | |

TABLE 11

Compounds represented by

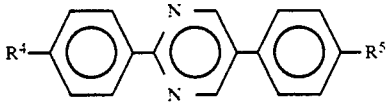

| R⁴ | R⁵ | R⁴ | R⁵ |
|---|---|---|---|
| C₄H₉O— | C₄H₉O— | C₉H₁₉O— | C₉H₁₉O— |
| C₅H₁₁O— | C₅H₁₁O— | C₁₀H₂₁O— | C₁₀H₂₁O— |
| C₆H₁₃O— | C₆H₁₃O— | C₁₁H₂₃O— | C₁₁H₂₃O— |
| C₇H₁₅O— | C₇H₁₅O— | C₁₂H₂₅O— | C₁₂H₂₅O— |
| C₈H₁₇O— | C₈H₁₇O— | C₁₄H₂₉O— | C₁₄H₂₉O— |
| C₄H₉— | C₄H₉O— | C₆H₁₃— | C₅H₁₁O— |
| " | C₅H₁₁O— | " | C₆H₁₃O— |
| " | C₆H₁₃O— | " | C₇H₁₅O— |
| " | C₇H₁₅O— | " | C₈H₁₇O— |
| " | C₈H₁₇O— | " | C₉H₁₉O— |
| " | C₉H₁₉O— | " | C₁₀H₂₁O— |
| " | C₁₀H₂₁O— | " | C₁₂H₂₅O— |
| " | C₁₁H₂₃O— | " | C₁₄H₂₉O— |
| " | C₁₂H₂₅O— | C₇H₁₅— | C₅H₁₁O— |
| " | C₁₄H₂₉O— | " | C₆H₁₃O— |
| C₅H₁₁— | C₅H₁₁O— | " | C₇H₁₅O— |
| " | C₆H₁₃O— | " | C₈H₁₇O— |
| " | C₇H₁₅O— | " | C₉H₁₉O— |
| " | C₈H₁₇O— | " | C₁₀H₂₁O— |
| " | C₉H₁₉O— | " | C₁₂H₂₅O— |
| C₅H₁₁— | C₁₀H₂₁O— | C₇H₁₅— | C₁₄H₂₉O— |
| " | C₁₂H₂₅O— | C₈H₁₇— | C₅H₁₁O— |
| " | C₁₄H₂₉O— | " | C₆H₁₃O— |
| C₈H₁₇— | C₇H₁₅O— | C₁₀H₂₁— | C₉H₁₉O— |
| " | C₈H₁₇O— | " | C₁₀H₂₁O— |
| " | C₉H₁₉O— | " | C₁₂H₂₅O— |
| " | C₁₀H₂₁O— | " | C₁₄H₂₉O— |
| " | C₁₂H₂₅O— | C₁₂H₂₅— | C₅H₁₁O— |
| " | C₁₄H₂₉O— | " | C₆H₁₃O— |
| C₉H₁₉— | C₅H₁₁O— | " | C₇H₁₅O— |
| " | C₆H₁₃O— | " | C₈H₁₇O— |
| " | C₇H₁₅O— | " | C₉H₁₉O— |
| " | C₈H₁₇O— | " | C₁₀H₂₁O— |
| " | C₉H₁₉O— | " | C₁₂H₂₅O— |
| " | C₁₀H₂₁O— | " | C₁₄H₂₉O— |
| " | C₁₂H₂₅O— | C₅H₁₁O— | C₅H₁₁— |
| " | C₁₄H₂₉O— | " | C₆H₁₃— |
| C₁₀H₂₁— | C₅H₁₁O— | " | C₇H₁₅— |
| " | C₆H₁₃O— | " | C₈H₁₇— |
| " | C₇H₁₅O— | " | C₉H₁₉— |
| " | C₈H₁₇O— | " | C₁₀H₂₁— |
| C₅H₁₁O— | C₁₂H₂₅— | C₈H₁₇O— | C₅H₁₁— |
| " | C₁₄H₂₉— | " | C₆H₁₃— |
| C₆H₁₃O— | C₅H₁₁— | C₈H₁₇O— | C₇H₁₅— |
| " | C₆H₁₃— | " | C₈H₁₇— |
| " | C₇H₁₅— | " | C₉H₁₉— |

TABLE 11-continued

Compounds represented by

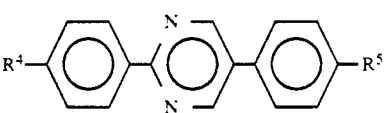

| R⁴ | R⁵ | R⁴ | R⁵ |
|---|---|---|---|
| " | C₈H₁₇— | " | C₁₀H₂₁— |
| " | C₉H₁₉— | " | C₁₂H₂₅— |
| " | C₁₀H₂₁— | " | C₁₄H₂₉— |
| " | C₁₂H₂₅— | C₉H₁₉O— | C₅H₁₁— |
| " | C₁₄H₂₉— | " | C₆H₁₃— |
| C₇H₁₅O— | C₅H₁₁— | " | C₇H₁₅— |
| " | C₆H₁₃— | " | C₈H₁₇— |
| " | C₇H₁₅— | " | C₉H₁₉— |
| " | C₈H₁₇— | " | C₁₀H₂₁— |
| " | C₉H₁₉— | " | C₁₂H₂₅— |
| " | C₁₀H₂₁— | " | C₁₄H₂₉— |
| " | C₁₂H₂₅— | C₁₀H₂₁O— | C₅H₁₁— |
| " | C₁₄H₂₉— | " | C₆H₁₃— |
| C₁₀H₂₁O— | C₇H₁₅— | C₁₂H₂₅O— | C₁₀H₂₁— |
| " | C₈H₁₇— | " | C₁₂H₂₅— |
| " | C₉H₁₉— | " | C₁₄H₂₉— |
| " | C₁₀H₂₁— | C₁₄H₂₉O— | C₅H₁₁— |
| " | C₁₂H₂₅— | " | C₆H₁₃— |
| " | C₁₄H₂₉— | " | C₇H₁₅— |
| C₁₂H₂₅O— | C₅H₁₁— | " | C₈C₁₇— |
| C₁₂H₂₅O— | C₆H₁₃— | C₁₄H₂₉O— | C₉H₁₉— |
| " | C₇H₁₅— | " | C₁₀H₂₁— |
| " | C₈H₁₇— | " | C₁₂H₂₅— |
| " | C₉H₁₉— | " | C₁₄H₂₉— |

TABLE 12

Compounds represented by

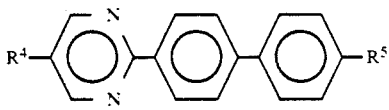

| R⁴ | R⁵ | R⁴ | R⁵ |
|---|---|---|---|
| C₄H₉— | C₄H₉O— | C₄H₉— | C₈H₁₇O— |
| " | C₅H₁₁O— | " | C₉H₁₉O— |
| " | C₆H₁₃O— | " | C₁₀H₂₁O— |
| " | C₇H₁₅O— | " | C₁₁H₂₃O— |
| " | C₁₂H₂₅O— | C₇H₁₅— | C₅H₁₁O— |
| " | C₁₄H₂₉O— | " | C₆H₁₃O— |
| C₅H₁₁— | C₅H₁₁O— | " | C₇H₁₅O— |
| " | C₆H₁₃O— | " | C₈H₁₇O— |
| " | C₇H₁₅O— | " | C₉H₁₉O— |
| " | C₈H₁₇O— | " | C₁₀H₂₁O— |
| " | C₉H₁₉O— | " | C₁₂H₂₅O— |
| " | C₁₀H₂₁O— | " | C₁₄H₂₉O— |
| " | C₁₂H₂₅O— | C₈H₁₇— | C₅H₁₁O— |
| " | C₁₄H₂₉O— | " | C₆H₁₃O— |
| C₆H₁₃— | C₅H₁₁O— | " | C₇H₁₅O— |
| " | C₆H₁₃O— | " | C₈H₁₇O— |
| " | C₇H₁₅O— | " | C₉H₁₉O— |
| " | C₈H₁₇O— | " | C₁₀H₂₁O— |
| " | C₉H₁₉O— | " | C₁₂H₂₅O— |
| " | C₁₀H₂₁O— | " | C₁₄H₂₉O— |
| R⁶ | R⁷ | R⁶ | R⁷ |
| C₆H₁₃— | C₁₂H₂₅O— | C₉H₁₉— | C₅H₁₁O— |
| " | C₁₄H₂₉O— | " | C₆H₁₃O— |
| C₉H₁₉— | C₇H₁₅O— | C₁₂H₂₅— | C₉H₁₉O— |
| " | C₈H₁₇O— | " | C₁₀H₂₁O— |
| " | C₉H₁₉O— | " | C₁₂H₂₅O— |
| " | C₁₀H₂₁O— | " | C₁₄H₂₉O— |
| " | C₁₂H₂₅O— | C₅H₁₁— | C₅H₁₁— |
| " | C₁₄H₂₉O— | " | C₆H₁₃— |

TABLE 12-continued

Compounds represented by

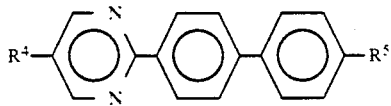

| R⁴ | R⁵ | R⁴ | R⁵ |
|---|---|---|---|
| C₁₀H₂₁— | C₅H₁₁O— | " | C₇H₁₅— |
| " | C₆H₁₃O— | " | C₈H₁₇— |
| " | C₇H₁₅O— | " | C₉H₁₉— |
| " | C₈H₁₇O— | " | C₁₀H₂₁— |
| " | C₉H₁₉O— | " | C₁₂H₂₅— |
| " | C₁₀H₂₁O— | " | C₁₄H₂₉— |
| " | C₁₂H₂₅O— | C₆H₁₃— | C₅H₁₁— |
| " | C₁₄H₂₉O— | " | C₆H₁₃— |
| C₁₂H₂₅— | C₅H₁₁O— | " | C₇H₁₅— |
| " | C₆H₁₃O— | " | C₈H₁₇— |
| " | C₇H₁₅O— | " | C₉H₁₉— |
| " | C₈H₁₇O— | " | C₁₀H₂₁— |
| C₆H₁₃— | C₁₂H₂₅— | C₉H₁₉— | C₅H₁₁— |
| " | C₁₄H₂₉— | C₉H₁₉— | C₆H₁₃ |
| C₇H₁₅— | C₅H₁₁— | " | C₇H₁₅— |
| R⁴ | R⁵ | R⁴ | R⁵ |
| C₇H₁₅— | C₆H₁₃— | C₉H₁₉— | C₈H₁₇— |
| " | C₇H₁₅— | " | C₉H₁₉— |
| " | C₈H₁₇— | " | C₁₀H₂₁— |
| " | C₉H₁₉— | " | C₁₂H₂₅— |
| " | C₁₀H₂₁— | " | C₁₄H₂₉— |
| " | C₁₂H₂₅— | C₁₀H₂₁— | C₅H₁₁— |
| " | C₁₄H₂₉— | " | C₆H₁₃— |
| C₈H₁₇— | C₅H₁₁— | " | C₇H₁₅— |
| " | C₆H₁₃— | " | C₈H₁₇— |
| " | C₇H₁₅— | " | C₉H₁₉— |
| " | C₈H₁₇— | " | C₁₀H₂₁— |
| " | C₉H₁₉— | " | C₁₂H₂₅— |
| " | C₁₀H₂₁— | " | C₁₄H₂₉— |
| " | C₁₂H₂₅— | C₁₂H₂₅— | C₅H₁₁— |
| " | C₁₄H₂₉— | " | C₆H₁₃— |
| C₁₂H₂₅— | C₇H₁₅— | C₁₄H₂₉— | C₅H₁₁— |
| " | C₈H₁₇— | " | C₆H₁₃— |
| " | C₉H₁₉— | " | C₇H₁₅— |
| " | C₁₀H₂₁— | " | C₈H₁₇— |
| " | C₁₂H₂₅— | " | C₉H₁₉— |
| " | C₁₄H₂₉— | " | C₁₀H₂₁— |
| | | " | C₁₂H₂₅— |
| | | " | C₁₄H₂₉— |

The base $S_m$ mixture in the ferroelectric liquid crystal composition regarding the present invention can be prepared by combining plural phenylpyrimidine series compounds alone having the $S_C$ phase enumerated in Tables 10 to 12, and it is also possible to combine one or more of these compounds with one or more of known non-chiral compounds in a range in which the object of the present invention is not damaged. Examples of the known non-chiral compounds include biphenylylbenzoate series, biphenylylcyclohexane series, azo series, azoxy series, phenylpyridine series and biphenyl series liquid crystal compounds which are rich in smectic C properties.

In the ferroelectric liquid crystal composition regarding the present invention, particularly preferable are combinations of the phenylpyridine series compounds of the formula (VIII) and the biphenyl series compounds of the general formula (IX).

Of the phenylpyridine series compounds represented by the formula (VIII), particularly preferable are compounds having the $S_C$ phase in which $R^{20}$ in the formula (VIII) is an alkyl group having 7 to 10 carbon atoms and $R^{21}$ is an alkoxy group having 4 to 12 carbon atoms.

Furthermore, of the biphenyl series compounds represented by the general formula (IX), particularly preferable are compounds having the $S_C$ phase in which $R^{22}$ in the formula (IX) is an alkoxy group having 7 to 10 carbon atoms, X is no group, and k is 3.

The pyrimidine series compounds represented by the formula (C), which are used as the component of the ferroelectric liquid crystal composition regarding the present invention, preferably have the $S_C$ phase as described above, but other compounds which do not assume the $S_C$ phase can also be used only in such amounts as not to noticeably decrease an $S_C$ phase temperature range of the obtained base $S_m$ compound.

This fact can be applied to the phenylpyridine series compounds and the biphenyl series compounds assuming no $S_C$ phase which are represented by the formulae (VIII) and (IX), and these compounds can be used with the intentions of lowering viscosity and regulating the $S_C$ phase temperature range.

The ferroelectric liquid crystal composition of the present invention can be prepared, as described above, by mixing the chiral compound having the optical activity site represented by the formula (A) [e.g., a compound represented by the formula (B)] with the nonchiral compound assuming the $S_C$ phase or the like [e.g., a pyrimidine series compound represented by the formula (C)]. In another embodiment, the ferroelectric liquid crystal composition having more excellent characteristics can be also obtained by the combination with the chiral compound represented by the formula (X) having a great spontaneous polarization value and a high upper limit temperature of the $S_C^*$ phase, or the combination with the compound represented by the formulae (XI) to (XV) in which the spontaneous polarization value is not so great but which can be used to adjust a helical pitch.

Most of compounds having the liquid crystal characteristics which are represented by the general formulae (B-I) to (XV) are known, and they are already disclosed in, for example, Japanese Patent Laid-open Publication Nos. 43/1986, 210,056/1986, 63,633/1986, 13,729/1985 and 122,334/1981. Furthermore, most of the other liquid crystal compounds will be disclosed in, for example, publications regarding Japanese Patent Application Nos. 49,796/1987 and 103,977/1987.

Now, the excellent function of the ferroelectric liquid crystal composition regarding the present invention will be described in detail in reference to liquid crystal component compounds A, B, C and D represented by the formulae (B-I) to (XV).

The present invention is based on the combination of the excellent characteristics which the liquid crystal component compounds A, B, C and D represented by the formulae (B-I) to (XV) have.

Here, the excellent characteristics of each liquid crystal component will be described in detail.

The compounds which can be used as the liquid crystal components A respesented by the formulae (B-I) to (B-V) are chiral compounds having very great spontaneous polarization values and are unknown compounds mentioned in the above-mentioned patent applications (Japanese Patent Application Nos. 49,796/1987 and 103,977/1987).

For example, in the case that in the formula (B-II), $R^8$ is $C_7H_{15}$—, $R^9$ is —$OC_3H_7$, and the absolute configuration is of (S, R) type, a phase transition temperature is $Cr_{55}S_C^*93I_{so}$, and $P_s$ is 165 nC/cm$^2$.

In general, there is the following relation between the spontaneous polarization value ($P_s$), viscosity ($\propto$) and response time ($\tau$):

$$\eta = \alpha (P_s \times E)$$

wherein E is field strength which is applied to a liquid crystal cell.

Therefore, it is required that the viscosity is low and the spontaneous polarization value is great.

The compounds represented by the formulae (B-I) to (B-V) which are the liquid crystal components A meet such requirements, and they play the important role to provide quick response properties.

Table 13 sets forth phase transition temperature, spontaneous polarization value, tilt angle and response time of the ferroelectric liquid crystal compositions which have been prepared by adding 20% by weight of the chiral compounds a to f represented by the formulae (B-I) to (B-IV) to base $S_m$ mixture A (phase transition temperature $Cr_4S_C65S_A79N90I_{so}$) comprising the nonchiral pyrimidine liquid crystal compounds represented by the formula (C-VI) and (C-VII) which will be described hereinafter.

The temperature at which the spontaneous polarization value, tilt angle and response time were measured was 25° C., and the field strength at the time of the response time measurement was 5 V/μm. Furthermore, the composition of the base $S_m$ mixture A was as follows:

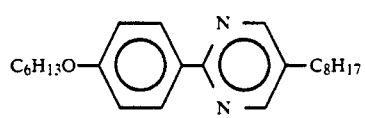

30% by weight

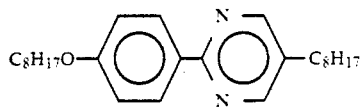 20% by weight
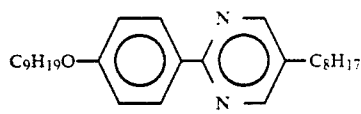 10% by weight
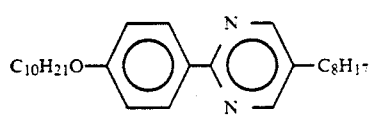 10% by weight
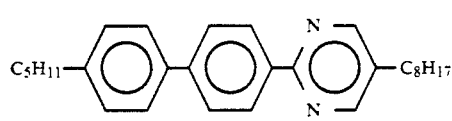 20% by weight
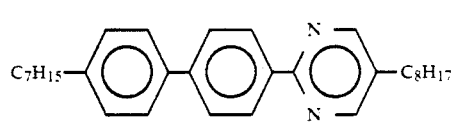 10% by weight
In addition, the chiral compounds a to f represented by the formulae (B-I) to (B-IV) belonging to the liquid crystal components A are as follows:
TABLE 13
| Chiral Compound | Phase Transition Temp. (°C.) | | | | | Spontaneous Polarization Value (nC/cm$^2$) | Tilt Angle (°) | Response Time (μsec) |
|---|---|---|---|---|---|---|---|---|
| | Cr | SC* | S$_A$ | N* | I$_{SO}$ | | | |
| a | . 0 | . 40 | . 71 | . 77 | . | 15 | 15 | 26 |
| b | . 5 | . 41 | . 77 | | . | 15 | 14 | 40 |
| c | . 3 | . 71 | . 86 | . 92 | . | 38 | 24 | 50 |
| d | . 5 | . 63 | | . 80 | . | 43 | 28 | 55 |
| e | . 8 | . 45 | . 86 | . 92 | . | 21 | 17 | 31 |
| f | . 5 | . 74 | . 86 | . 94 | . | 31 | 27 | 55 |
a (S, S) 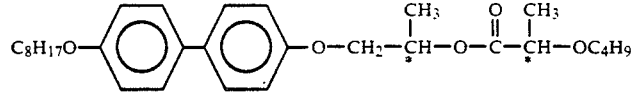
b (S, S) 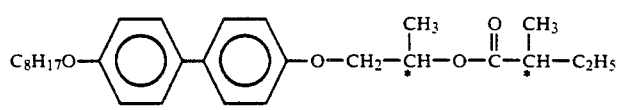
c (S, S) 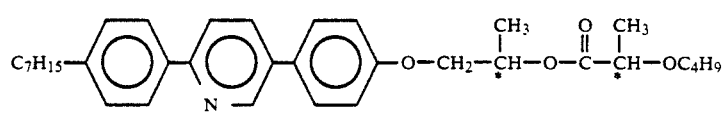
d (S, S) 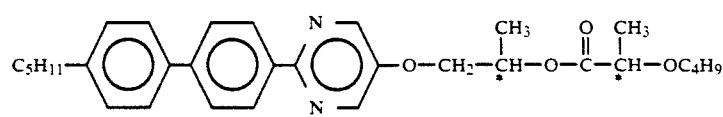

TABLE 13-continued

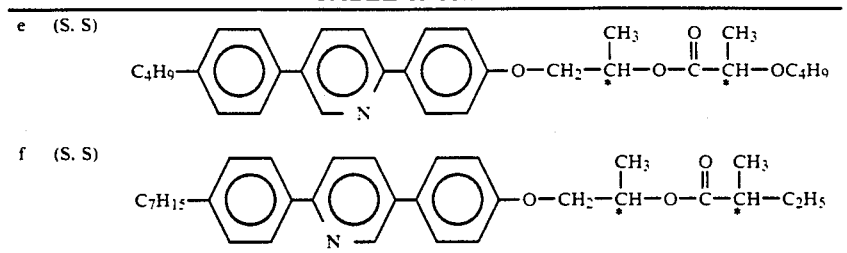

| | | |
|---|---|---|
| e | (S. S) | C₄H₉—⟨○⟩—⟨○⟩—⟨○⟩(N)—O—CH₂—*CH(CH₃)—O—C(=O)—*CH(CH₃)—OC₄H₉ |
| f | (S. S) | C₇H₁₅—⟨○⟩—⟨○⟩—⟨○⟩(N)—O—CH₂—*CH(CH₃)—O—C(=O)—*CH(CH₃)—C₂H₅ |

As is seen from the results in Table 13, the chiral compounds which are the liquid crystal components A represented by the formulae (B-I) to (B-IV) have very great spontaneous polarization values (extrapolated value about 100 nC/cm$^2$), and therefore when they are mixed with non-chiral compounds represented by the formulae (C-VI) and (C-VII), the ferroelectric liquid crystal compositions can be obtained having a very quick responsive property(30 to 50 μsec) (this response time is as short as about 1/10 of that of the ferroelectric liquid crystal compositions disclosed in Japanese Patent Laid-open Publication No. 291679/1986 and the pamphlet of PCT International Disclosure WO 86/06401). The liquid crystal component A plays the very important role of providing the quick response properties, but if too large an amount of this component is used, the temperature range of the $S_C*$ phase tends to narrow. For this reason, the concentration of the liquid crystal component A is preferably 40% by weight or less. In the case that the absolute configuration of the optical activity site in the formula (A) is of an (S, S) type or (S, R) type, the sense of the spontaneous polarization of the compounds represented by the formulae (B-I) to (B-V) is minus, and the polarity of the twist is left (in the case that the absolute configuration is of an (R, R) type or (R, S) type, they are plus and right).

The compounds represented by the formulae (C-VI) to (IX) which are the liquid crystal components B are non-chiral and play the role as the base $S_m$ compounds in the ferroelectric liquid crystal composition of the present invention. The compounds represented by the formula (C-VI) have the $S_C$ phase in a low-temperature range (e.g., when R$^{16}$ is C$_6$H$_{13}$O— and R$^{17}$ is C$_8$H$_{17}$—, a phase transition temperature is Cr28S$_C$47S$_A$58N66I$_{so}$), and on the other hand, the compounds represented by the formula (C-VII) have the $S_C$ phase in a high-temperature range (e.g., when R$^{18}$ is C$_7$H$_{15}$— and R$^{19}$ is C$_8$H$_{17}$—, the phase transition temperature is Cr58S$_C$134S$_A$144N157I$_{so}$). Thus, when the compound having the formula (C-VI) is combined with the compound having the formula (C-VII), the base $S_m$ mixture which has the $S_C$ phase in an extensive temperature range inclusive of low temperatures can be obtained.

The excellent characteristics of the compounds having this skeletal structure are described in Japanese Patent Laid-open Publication No. 291679/1986 of the same applicant as in the present case, and as understood from this description, the above-mentioned compounds have very low viscosity. Therefore, they play an important role as the base $S_C$ compounds in the ferroelectric liquid crystal composition of the present invention.

On the other hand, the compounds represented by the formula (VIII) have the $S_C$ phase or the like in an extensive temperature range including low and high temperatures (e.g., when R$^{20}$ is C$_7$H$_{15}$— and R$^{21}$ is C$_7$H$_{15}$O—, a phase transition temperature is Cr24S$_H$32S$_G$40S$_F$53S$_C$77I$_{so}$), and on the other hand, the compounds represented by the formula (IX) have the $S_C$ phase or the like in a low-temperature range (e.g., when R$^{22}$ is C$_7$H$_{15}$O—, X is absent and k is 3, the phase transition temperature is Cr20S$_G$40S$_F$51S$_C$53I$_{so}$). The excellent characteristics of the compounds having this skeletal structure are described in EP 86108266, and as understood from the description, the above-mentioned compounds have very low viscosity, as in the above-mentioned pyrimidine compounds. Therefore, they play the role as the base $S_m$ compounds in the ferroelectric liquid crystal composition, and they are used with the intention of adjusting the temperature range of the $S_C$ phase. The compounds represented by the formulae (C-VI) to (IX) which are the liquid crystal components B play the role as the base $S_m$ compounds in the present invention, and therefore the concentration of the liquid crystal component B is preferably 75% by weight or less.

Compounds represented by the formula (X) which are the liquid crystal components C are chiral and already disclosed in Japanese Patent Laid-open Publication Nos. 43/1986 and 210,056/1986. These compounds assume the $S_C*$ phase in a high-temperature range and have very great spontaneous polarization values (e.g., in the formula (X), when R$^{23}$ is C$_8$H$_{17}$O— and Y is —F, a phase transition temperature is Cr52S$_C$*104N*109I$_{so}$ and P$_S$ is 132 nC/cm$^2$ (T−T$_C$= −30° C.); when R$^{23}$ is C$_6$H$_{13}$O— and Y is —H, a phase transition temperature is Cr71S$_C$*98N*123I$_{so}$ and P$_S$ is 110 nC/cm$^2$ (T−T$_C$= −30° C.); when R$^{23}$ is C$_8$H$_{17}$O— and Y is —CN, a phase transition temperature is Cr28S$_C$*57S$_A$9-41I$_{so}$ and P$_S$ is 240 nC/cm$^2$(T−T$_C$= −30° C.) wherein T is measured temperature and T$_C$ is the upper limit temperature of S$_C$* range. Therefore, it is apparent that in the ferroelectric liquid crystal composition of the present invention, the compounds represented by the formula (X) play the important roles of providing quick response ability and heightening the S$_C$* phase upper limit temperature of the composition. For example, the ferroelectric liquid crystal composition comprising the above mentioned chiral compound "a" in Table 13 and the base $S_m$ mixture A is indeed excellent in responsive properties, but this composition is not considered to be practical, since its $S_C^*$ phase upper limit temperature is low (in practice, the upper limit temperature must be at least 50° C.). To 90% by weight of this composition, 10% by weight of a compound in which in the formula (X), Y is —F and $R^{23}$ is $C_6H_{13}$— was added, in order to prepare a ferroelectric liquid crystal composition B.

| Composition B | |
| --- | --- |
| Base $S_m$ Mixture A | 72% by weight |
| Chiral Compound a | 18% by weight |
| 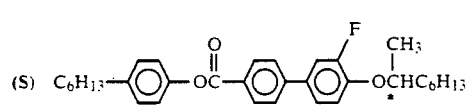 | 10% by weight |
| (S) $C_6H_{13}$—⬡—OC—⬡—⬡—OCHC$_6$H$_{13}$ (F, CH$_3$) | |

This ferroelectric liquid crystal composition B assumed the $S_C^*$ phase in a temperature range of −5° C. to 55° C., the $S_A$ phase on the high-temperature side of the range, the N* phase at 70° C., and an isotropic liquid state at 84° C. Furthermore, with regard to this composition B, a spontaneous polarization value at 25° C. was 20 $nC/cm^2$, a tilt angle was 21.5°, and a response time was 50 $\mu$sec. (E = ±5V/$\mu$m). That is, the thus obtained ferroelectric liquid crystal composition could maintain such a response property as the ferroelectric liquid crystal compositions in Table 12 have, and could have the very quick response properties and the extensive $S_C^*$ phase temperature range.

It has been understood from the foregoing that the combination of the non-chiral compound having the formula (C-VI) or (C-VII) with the chiral compound having any one of the formulae (B-I) to (B-V) and (X) permits obtaining the ferroelectric liquid crystal material which can assume the $S_C^*$ phase in the extensive temperature range inclusive of room temperature and which is very excellent in responsive properties. Taking the concentrations of the liquid crystals A and B as well as the effect of the liquid crystal C into consideration, it is desirable that the concentration of the liquid crystal C is 35% by weight of less. Moreover, with regard to this compound which is the liquid crystal component C, the polarity of spontaneous polarization was minus when an absolute configuration at the optical activity site was S type, and a helical twist sense was left (when the absolute configuration was R type, they were plus and right). In this connection, when the ferroelectric liquid crystal composition is prepared from compounds in which the spontaneous polarization polarity is inverse, the spontaneous polarization value is occasionally small and the response properties is inconveniently poor (e.g., see Japanese Patent Laid-open Publication No. 231,082/1986). In consequence, the ferroelectric liquid crystal composition of the present invention is to be prepared by the use of the compounds represented by the formulae (B-I) to (B-V) and (X) in which the spontaneous polarization polarities are the same in most cases.

In order to obtain the ferroelectric liquid crystal composition of the present invention having the excellent characteristics by the utilization of the liquid crystal components A, B and C, various blend proportions of these components have been investigated, and as a result, it has been found that the preferable ratio is 5 to 40% by weight of the liquid crystal component A, 20 to 75% by weight of the liquid crystal component and 5 to 35% by weight of the liquid crystal component.

Compounds represented by the formulae (XI) to (XV) which are the liquid crystal components D are chiral compounds having not so great spontaneous polarization values, and they play the role of adjusting a helical pitch. Therefore, these compounds are used, when needed. With regard to the compounds represented by the formulae (XI) to (XV), the helical twist sense is right, when the absolute configuration of the optical activity site is S type. This helical twist sense is opposite to that of the compounds represented by the formulae (B-I) to (B-V) and (X). Therefore, if the compound represented by any of the formulae (XI) to (XV) is used, the ferroelectric liquid crystal composition having a prolonged helical pitch can be obtained. Furthermore, the spontaneous polarization polarity of the compounds represented by the formulae (XI) to (XV) is plus, when the optical activity site is the S type [however, with regard to compounds in which Y in the formulae (XIII) and (XIV) is —CN, the spontaneous polarization polarity is minus), and this spontaneous polarization sense is opposite to that of the compounds represented by the formulae (B-I) to (B-V) and (X). However, in the compounds represented by the formulae (XI) to (XV), the spontaneous polarization values are very small (about 1$nC/cm^2$) and the concentration is low, when used. Therefore, these compounds do not adversely affect the achievement of the quick response in the ferroelectric liquid crystal composition of the present invention.

Typical examples of the compounds represented by the formula (XI) to (XIV) which are the liquid crystal components D are as follows:

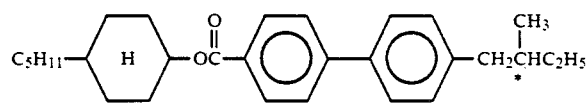

-continued
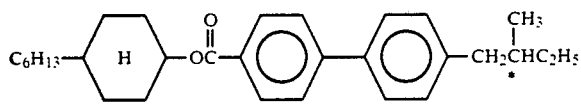
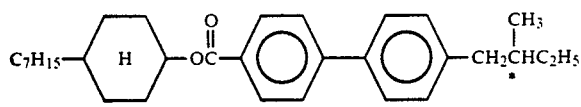
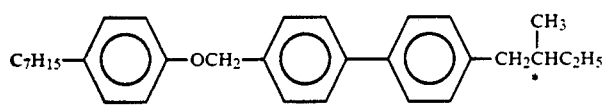
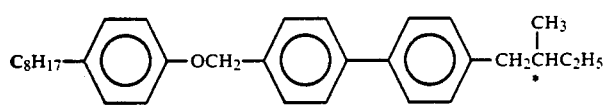
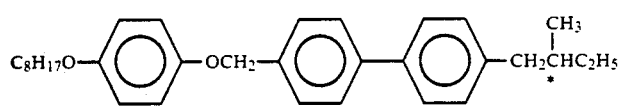
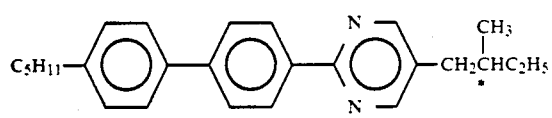
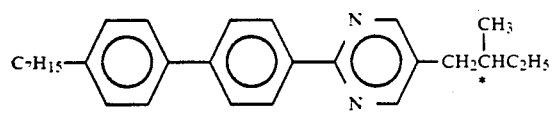
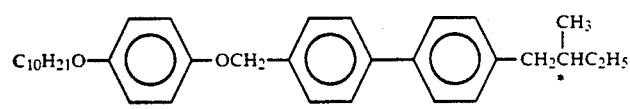
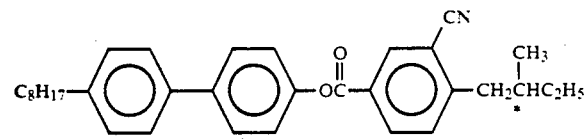
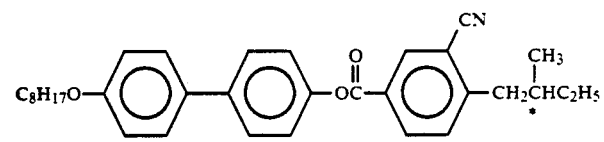
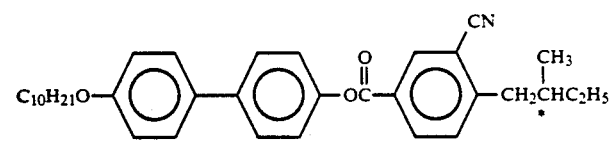
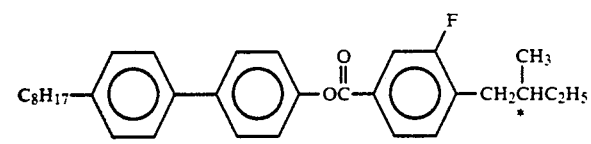

-continued

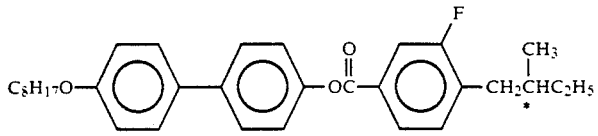

Considering the fact that the liquid crystal component D is used to adjust the helical pitch of the ferroelectric liquid crystal composition and the fact that in the component D, the spontaneous polarization value is low and the response is not so quick, and considering the concentrations of the liquid crystal components A, B and C as well as the effect of the liquid crystal component D, it is preferred that the concentration of the liquid crystal component D in the ferroelectric liquid crystal composition is 25% by weight or less with respect to the total weight of the liquid crystal components A, B and C. Furthermore, since the liquid crystal component D is used for the purpose of adjusting the helical pitch, usable compounds for the liquid crystal component D are not limited to the compounds represented by the formulae (XI) to (XIV), and other compounds having the following optical activity sites

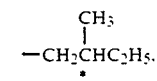

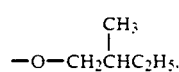

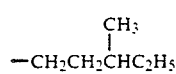

can be also used in the ferroelectric liquid crystal composition of the present invention.

In obtaining the ferroelectric liquid crystal composition having excellent characteristics by the utilization of the features of the liquid crystal components A, B, C and D, these components are used in a ratio of 5 to 40% by weight of the liquid crystal component A, 20 to 75% by weight of the liquid crystal component B and 5 to 35% by weight of the liquid crystal component C, the ratio of the liquid crystal component D being from 5 to 25% by weight with respect to the total weight of the three components A, B and C.

According to the present invention, the specific liquid crystal compounds are combined suitably in order to provide a ferroelectric liquid crystal composition having a quick response property and assuming an $S_C^*$ phase in an extensive temperature range inclusive of room temperature.

In addition, an optical switching element containing the liquid crystal composition of the present invention can perform a sharp switching operation and can provide a very excellent contrast and an extremely quick response in either a birefringence display system or a guest/host display system.

EXAMPLES

The present invention will be described in detail in reference to examples, but the scope of the present invention should not be limited to these examples.

Values of spontaneous polarization ($P_S$) were measured by the Sayer-Tower method, and values of helical pitch (P) were determined by directly measuring each interval between striped lines (dechiralization lines) corresponding to the helical pitch under a polarizing microscope by the use of a cell having a thickness of about 200 μm which had been subjected to homogeneous alignment. Tilt angles ($\theta$) were determined by first applying a sufficiently high electric field of critical field or more to the cell which had been subjected to the homogeneous alignment, extinguishing a helical structure, reversing polarity, and measuring a mobile angle (corresponding to $\theta$) of an extinction phase under crossed nicols.

A response time was determined by putting each composition in the cell having an electrode interval of 2 μm which had been subjected to an alignment treatment, and measuring a change in intensity of transmitted light at the time when a rectangular wave having Vpp of 20 V and 100 Hz was applied.

In the undermentioned examples, there are compositions containing chiral compounds which do not assume a liquid crystal phase such as an $S_C^*$ phase but have great potential spontaneous polarization values (e.g., see Japanese Patent Application No. 133,269/1986), and such chiral compounds do not impair the characteristics of the ferroelectric liquid crystal composition. Therefore, it is acceptable that the compositions contain the chiral compounds.

EXAMPLES 1 TO 17

Ferroelectric liquid crystal compositions regarding the present invention in Examples 1 to 17 are set forth in Table 14, and characteristics thereof are set forth in Table 15.

The figures in Table 1 are on percent by weight.

TABLE 14

| Component | Formula | Compound | Example 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|---|
| A | B-I | (S,S) C$_8$H$_{17}$O–⟨phenyl⟩–⟨phenyl⟩–OCH$_2$CHOCCHOC$_4$H$_9$ (CH$_3$, OCH$_3$) | 5 | 10 | 5 | | | | | | | | | | | | | 5 | |
| | B-I | (S,S) C$_8$H$_{17}$O–⟨phenyl⟩–⟨phenyl⟩–OCH$_2$CHOCCHOC$_2$H$_5$ (CH$_3$, OCH$_3$) | | | | 5 | | | | | | | | | | | | | |
| | B-I | (S,R) C$_8$H$_{17}$O–⟨phenyl⟩–⟨phenyl⟩–OCH$_2$CHOCCHOC$_3$H$_7$ (CH$_3$, OCH$_3$) | | | 10 | 10 | 10 | 5 | | | | | | | | | | | |
| | B-I | (S,R) C$_8$H$_{17}$O–⟨phenyl⟩–⟨phenyl⟩–OCH$_2$CHOCCHOC$_4$H$_9$ (CH$_3$, OCH$_3$) | | | | | 10 | 10 | 5 | 5 | 5 | | | | | | | | 5 |
| | B-II | (S,S) C$_7$H$_{15}$–⟨phenyl⟩–⟨pyridine⟩–⟨phenyl⟩–OCH$_2$CHOCCHOC$_4$H$_9$ (CH$_3$, OCH$_3$) | | | | | | | | | | 10 | 20 | 10 | | | | | |
| | B-II | (S,S) C$_7$H$_{15}$–⟨phenyl⟩–⟨pyridine⟩–⟨phenyl⟩–OCH$_2$CHOCCHOC$_2$H$_5$ (CH$_3$, OCH$_3$) | | | | | | | | | | | | 10 | 10 | | | | |
| A | B-III | (S,S) C$_5$H$_{11}$–⟨phenyl⟩–⟨phenyl⟩–⟨pyridine⟩–OCH$_2$CHOCCHOC$_4$H$_9$ (CH$_3$, OCH$_3$) | | | | | | | | | | | | | | 10 | 15 | 10 | |
| | B-IV | (S,S) C$_4$H$_9$–⟨phenyl⟩–⟨pyridine⟩–⟨phenyl⟩–OCH$_2$CHOCCHOC$_4$H$_9$ (CH$_3$, OCH$_3$) | | | | | | | | | | 10 | | | 10 | | | | 5 |

TABLE 14-continued

| Component | Formula | Compound | Example |||||||||||||||||
|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | 17 |
| B | B-V | [biphenyl-pyridine with (S,S) $C_8H_{17}$ and $OCH_2CHOCCHOC_4H_9$, $CH_3$, $OCH_3$] | 10 | 5.5 | 12 | 5 | 10 | 8 | 11 | 8 | 4 | 12 | 3.5 | 12 | 12 | 3.5 | 21 | 17.5 | 26.3 |
| | C-VI | [pyridine-phenyl with $C_6H_{13}O$ and $C_8H_{17}$] | | | | | 5 | 4 | 5.5 | 4 | | | | | | | | | |
| | C-VI | [pyridine-phenyl with $C_8H_{17}O$ and $C_8H_{17}$] | | | 6 | | | | | | | | | | | | | | |
| | C-VI | [pyridine-phenyl with $C_9H_{19}O$ and $C_7H_{15}$] | 2 | 1.8 | | | 1.5 | 2 | 2.8 | 2 | | 3.5 | | | 3.5 | | 6 | 5 | 7.5 |
| | C-VI | [pyridine-phenyl with $C_9H_{19}O$ and $C_8H_{17}$] | 4 | 3 | | | 2.5 | 2 | 2.7 | 2 | | 7 | | 7 | | 12 | | 10 | 15 |
| B | C-VI | [pyridine-phenyl with $C_{10}H_{21}O$ and $C_8H_{17}$] | | 3 | | | 2.5 | 2 | 3 | 2 | | | | | | | | | |
| | C-VII | [pyridyl-biphenyl with $C_5H_{11}$ and $C_6H_{13}$] | 7 | 5.5 | 11.4 | 5 | 9.5 | 8 | 11 | 8 | 4 | 7 | 3.5 | 7 | 7 | 3.5 | 12 | 10 | 15 |
| | C-VII | [pyridyl-biphenyl with $C_5H_{11}$ and $C_8H_{17}$] | 5 | 7.8 | 5 | 11.5 | 11 | 13 | 11 | | 5 | 5 | 5 | 5 | 5 | 5 | | | |

TABLE 14-continued
| Component | Formula | Compound | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|---|
| | C-VII |  | 3 | 5.5 | | 5 | | | | | 4 | | 3.5 | | | 3.5 | | | |
| | C-VII |  | 6 | 5.5 | 15 | 5 | 12.5 | 8 | 11 | 8 | 4 | 5.5 | 3.5 | 5.5 | 5.5 | 3.5 | 9 | 7.5 | 11.2 |
| B | C-VII | 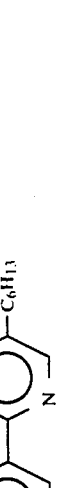 | 5 | 5.5 | 5 | 5 | 5 | 5 | | 5 | 5 | 5 | 5 | 5 | 5 | 5 | | | |
| | C-VII |  | 3 | 5.5 | | 5 | | | | | 4 | | 3.5 | | | 3.5 | | | |
| | VIII |  | 3 | 5.5 | | 5 | | | | | 4 | | 3.5 | | | 3.5 | | | |
| | VIII |  | 3 | 5.5 | | 5 | | | | | 4 | | 3.5 | | | 3.5 | | | |
| | VIII | 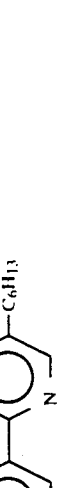 | 3 | 5.5 | | 5 | | | | | 4 | | 3.5 | | | 3.5 | | | |
| | VIII |  | | | | | | | | | | | | | | | | | |

TABLE 14-continued

| Component | Formula | Compound | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|---|
| B | VIII | 4-OC₁₂H₂₅-phenyl-pyridine-C₁₀H₂₁ | 3 | 5.5 | | 5 | | | | | 4 | 3.5 | 3.5 | | | 3.5 | | | |
| | IX | C₈H₁₇O-biphenyl-(CH₂)₃CHC₂H₅(CH₃)(*) | | | | | | 15 | 15 | 15 | | | | | | | | | |
| C | X | F, CH₃, OCHC₆H₁₃ terphenyl ester (S)C₆H₁₃ | 10 | 10 | 10 | 10 | 10 | 10 | 10 | 10 | 10 | 20 | | | | | | | |
| | X | F, CH₃, OCHC₆H₁₃ terphenyl ester (S)C₇H₁₅ | | | 5 | | | | 15 | 10 | 20 | 10 | | | | | 10 | | |
| | X | CN, CH₃, OCHC₆H₁₃ terphenyl ester (S)C₇H₁₅O | | | | | 5 | 5 | | 5 | 5 | | | | | | | 10 | 5 |
| | X | CN, CH₃, CHC₆H₁₃ terphenyl ester (S)C₈H₁₇O | | | | | | | | | | | | 20 | | | | | |
| | X | CN, CH₃, OCHC₆H₁₃ terphenyl ester (S)C₈H₁₇ | | | | | | | | | | | | | 20 | 20 | | | |
| C | X | | | | | | | | | | | | 20 | | | | | | |

TABLE 14-continued

| Component | Formula | Compound | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|---|
| | X | (S) C$_7$H$_{15}$—⌬—⌬—OC(=O)—⌬—O—CH(CH$_3$)C$_6$H$_{13}$ * | | 5 | | | | | | | | | | | | | | | |
| D | XI | (S) C$_5$H$_{11}$—⌬—C(=O)O—⌬—⌬—CH(CH$_3$)CH$_2$C$_2$H$_5$ * | | | 5 | | | | | | 5 | | 5 | 5 | 5 | | | | |
| | XII | (S) C$_8$H$_{17}$—⌬—OCH$_2$—⌬—⌬—CH(CH$_3$)CH$_2$C$_2$H$_5$ * | 10 | | | | | | | 5 | 5 | | | | | 10 | | | |
| | XIII | (S) C$_8$H$_{17}$O—⌬—⌬—C(=O)O—⌬(CN)—CH(CH$_3$)CH$_2$C$_2$H$_5$ * | | | | 10 | 10 | | | | | 10 | | | | | 10 | 10 | |
| | XIII | (S) C$_{10}$H$_{21}$O—⌬—⌬—C(=O)O—⌬(CN)—CH(CH$_3$)CH$_2$C$_2$H$_5$ * | | | | | | 5 | 5 | | | | | 5 | | | | | |
| D | XIII | (S) C$_8$H$_{17}$—⌬—⌬—C(=O)O—⌬(CN)—CH(CH$_3$)CH$_2$C$_2$H$_5$ * | | | | | | | | | | | 10 | | | | | 10 | |
| | XIV | (S) C$_8$H$_{17}$O—⌬—C(=O)O—⌬—⌬(CN)—CH(CH$_3$)CH$_2$C$_2$H$_5$ * | | | | | | | | | | | | | | | | | 5 |

TABLE 14-continued

| Component | Formula | Compound | \multicolumn{17}{c}{Example} |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | 17 |
| | XV | (S) C$_5$H$_{11}$—⌬—⌬—[pyrimidine]—CH$_2$CHC$_2$H$_5$ (CH$_3$, *) | 10 | 10 | | | | | | | | | 5 | | | 5 | 5 | 10 | 5 |
| | | (S) C$_8$H$_{17}$O—⌬—⌬—OCH$_2$CHOCC$_4$H$_9$ (CH$_3$, O, *) | | | | | | 10 | 10 | 10 | 10 | | | | | | | | |

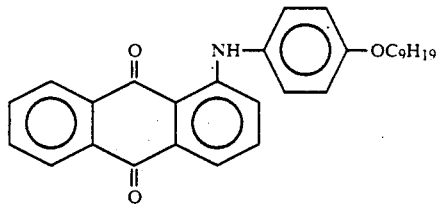

TABLE 15

| Example | Phase Transition Temp. (°C.) | | | | | Spontaneous Polarization Value** (nC/cm²) | Helical Pitch** (μm) | Tilt Angle** (°) | Response Time** (μsec) |
|---|---|---|---|---|---|---|---|---|---|
| | Cr | S$_C^*$ | S$_A$ | N* | I$_{so}$ | | | | |
| 1  | • −21 | • 61 | • 78 | • 88 | • | 28 | 11 | 24 | 80 |
| 2  | • −32 | • 63 | • 74 | • 80 | • | 52 | 2  | 31 | 60 |
| 3  | • −10 | • 54 | • 70 | • 84 | • | 32 | 2  | 22 | 50 |
| 4  | • −30 | • 63 | • 86 | • 88 | • | 34 | 6  | 24 | 85 |
| 5  | • −5  | • 56 | • 80 | • 90 | • | 29 | 7  | 20 | 78 |
| 6  | • −6  | • 60 | • 71 | • 80 | • | 28 | 3  | 28 | 58 |
| 7  | • −6  | • 65 | • 78 | • 89 | • | 25 | 4  | 24 | 58 |
| 8  | • −4  | • 60 | • 71 | • 79 | • | 27 | 3  | 28 | 58 |
| 9  | • −25 | • 64 | • 73 | • 76 | • | 31 | 3  | 28 | 78 |
| 10 | • *** | • 68 | • 89 | • 98 | • | 59 | 8  | 28 | 49 |
| 11 | • *** | • 84 | • 92 | • 101 | • | 61 | 10 | 35 | 88 |
| 12 | • *** | • 65 | • 82 | • 89 | • | 66 | 2  | 26 | 65 |
| 13 | • *** | • 69 | • 92 | • 97 | • | 66 | 2  | 26 | 65 |
| 14 | • *** | • 83 |      | • 96 | • | 83 | 5  | 36 | 80 |
| 15 | • −12 | • 62 |      | • 90 | • | 40 | 4  | 32 | 78 |
| 16 | • −18 | • 58 |      | • 88 | • | 41 | 8  | 31 | 83 |
| 17 | • −8  | • 60 | • 64 | • 86 | • | 17 | 10 | 28 | 89 |

**Values measured at 25° C.
***Crystallization was not observed even when each sample was cooled to −50° C., and thus a melting point was indefinite.

EXAMPLE 18

The ferroelectric liquid crystal composition prepared in Example 10 was put in a cell prepared by coating with PVA of an alignment agent and then rubbing on surfaces to perform parallel alignment, the cell being equipped with a pair of transparent electrodes and having a cell gap of 2 μm. This liquid crystal cell was interposed between two polarizers arranged in the crossed nicols state, and low-frequency alternating current of 0.5 Hz and 20 V was applied to the cell. In the thus formed liquid crystal display element, switching behavior was sharp and was very excellent in contrast (1:20), and response time was short, 25 μsec at 25° C.

EXAMPLE 19

To the ferroelectric liquid crystal composition prepared in Example 11 was added 3% by weight of anthraquinone series dye D-16 (made by BDH Co., Ltd.) represented by the formula in order to prepare a guest/host type composition. The latter was then put in a cell having a cell gap of 8 μm which had been subjected to the same treatment as in Example 18. One polarizer was arranged so that a polarizing plane might be in parallel with a molecular axis, and low-frequency alternating current of 0.5 Hz and 40 V was applied thereto. In the thus formed color liquid crystal display element, switching behavior was sharp and was excellent in contrast (1:10), and response time was short, 80 μsec at 25° C.

What is claimed is:

1. A ferroelectric liquid crystal composition comprising at least three liquid crystal components A, B and C as defined below, the proportions of these components being 5 to 40% by weight of A, 20 to 75% by weight of B and 5 to 35% by weight of C with respect to the total weight of said three components;

said liquid crystal component A being comprised of one or more members selected from the group consisting of compounds represented by the following formulae (B-I), (B-II), (B-III), (B-IV) and (B-V);

the formula (B-I):

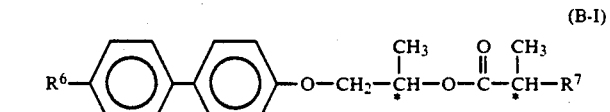

(B-I)

wherein R$^6$ is a straight-chain or branched alkyl group or alkoxy group having 1 to 18 carbon atoms, $R^7$ is straight-chain or branched alkyl group having 2 to 18 carbon atoms or a straight-chain or branched alkoxy group having 1 to 18 carbon atoms, and * indicates an asymmetric carbon atom, the formula (B-II):

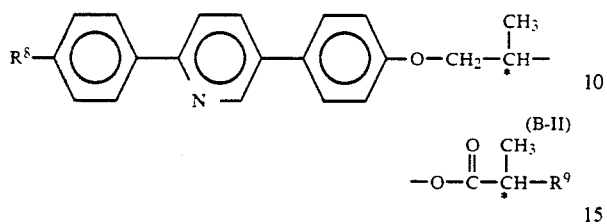

wherein $R^8$ is a straight-chain or branched alkyl group or alkoxy group having 1 to 18 carbon atoms, $R^9$ is a straight-chain or branched alkyl group having 2 to 18 carbon atoms or a straight-chain or branched alkoxy group having 1 to 18 carbon atoms, and * indicates an asymmetric carbon atom, the formula (B-III):

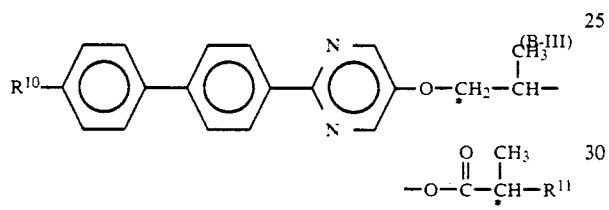

wherein $R^{10}$ is a straight-chain or branched alkyl group or alkoxy group having 1 to 18 carbon atoms, $R^{11}$ is a straight-chain or branched alkyl group having 2 to 18 carbon atoms or a straight-chain or branched alkoxy group having 1 to 18 carbon atoms, and * indicates an asymmetric carbon atom, the formula (B-IV):

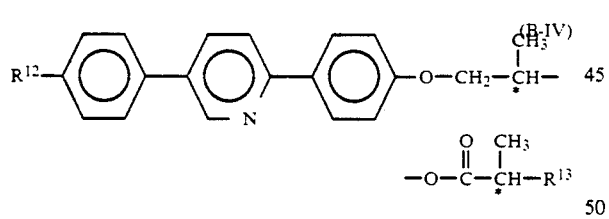

wherein $R^{12}$ is a straight-chain or branched alkyl group or alkoxy group having 1 to 18 carbon atoms, $R^{13}$ is a straight-chain or branched alkyl group having 2 to 18 carbon atoms or a straight-chain or branched alkoxy group having 1 to 18 carbon atoms, and * indicates an asymmetric carbon atom, and the formula (B-V):

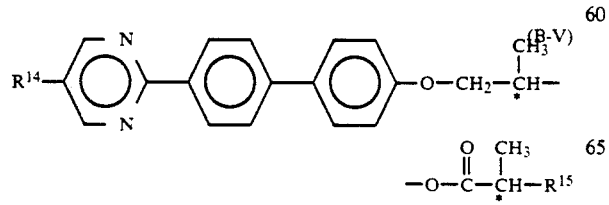

wherein $R^{14}$ is a straight-chain or branched alkyl group or alkoxy group having 1 to 18 carbon atoms, $R^{15}$ is a straight-chain or branched alkyl group having 2 to 18 carbon atoms or a straight-chain or branched alkoxy group having 1 to 18 carbon atoms, and * indicates an asymmetric carbon atom, said liquid crystal component B being comprised of one or more members selected from the group consisting of compounds represented by the following formulae (C-VI), (C-VII), (VIII) and (IX);

the formula (C-VI):

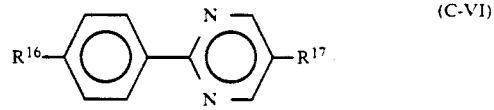

wherein $R^{16}$ and $R^{17}$ are identical or different and each of them is a straight-chain or branched alkyl group of alkoxy group having 1 to 18 carbon atoms;

the formula (C-VII):

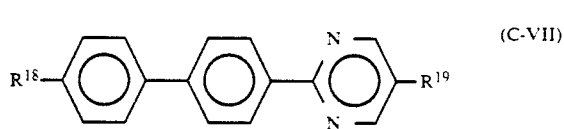

wherein $R^{18}$ and $R^{19}$ are identical or different and each of them is a straight-chain or branched alkyl group or alkoxy group having 1 to 18 carbon atoms, the formula (VIII):

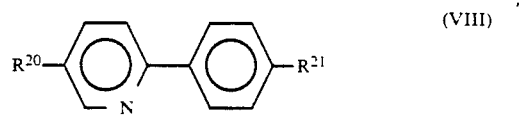

wherein $R^{20}$ and $R^{21}$ are identical or different and each of them is a straight-chain or branched alkyl group or alkoxy group having 1 to 18 carbon atoms, and the formula (IX):

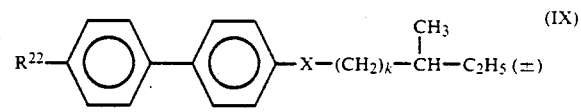

wherein $R^{22}$ is a straight-chain or branched alkyl group or alkoxy group having 1 to 18 carbon atoms, X is a single bond or —O—, k is a value of from 0 to 10, and (±) indicates a racemic compound, said liquid crystal component C being comprised of one or more members selected from the group consisting of compounds represented by the formula (X)

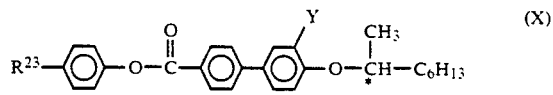

wherein $R^{23}$ is a straight-chain or branched alkyl group or alkoxy group having 1 to 18 carbon atoms, Y is —H, —F or —CN, and * indicates an asymmetric carbon atom.

2. A ferroelectric liquid crystal composition according to claim 1 further including a fourth component, component D, the amount of said component D present being 5 to 25% by weight with respect to the total weight of said three components A, B and C and said liquid crystal component D is one or more members selected from the group consisting of compounds represented by the following formulae (XI), (XII), (XIII), (XIV) and (XV);

the formula (XI):

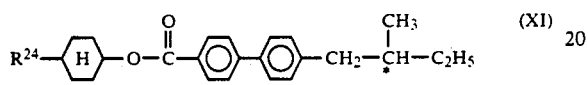
(XI)

wherein $R^{24}$ is a straight-chain or branched alkyl group having 1 to 18 carbon atoms, and * indicates an asymmetric carbon atom, the formula (XII):

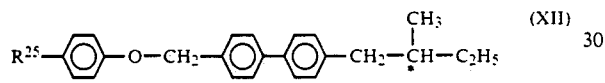
(XII)

wherein $R^{25}$ is a straight-chain or branched alkyl group or alkoxy group having 1 to 18 carbon atoms, and * indicates an asymmetric carbon atom, the formula (XIII):

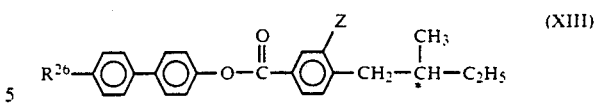
(XIII)

wherein $R^{26}$ is a straight-chain or branched alkyl group or alkoxy group having 1 to 18 carbon atoms, Z is —H, —F or —CN, and * indicates an asymmetric carbon atom, the formula (XIV):

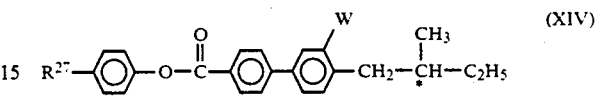
(XIV)

wherein $R^{27}$ is a straight-chain or branched alkyl group or alkoxy group having 1 to 18 carbon atoms, W is —H, —F or —CN, and * indicates an asymmetric carbon atom, and the formula (XV):

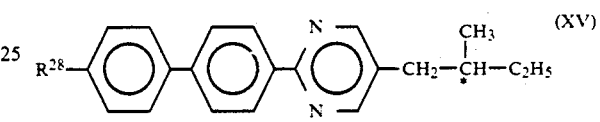
(XV)

wherein $R^{28}$ is a straight-chain or branched alkyl group or alkoxy group having 1 to 18 carbon atoms, and * indicates an asymmetric carbon atom.

3. An optical switching element containing a ferroelectric liquid crystal composition described in claim 1.

4. An optical switching element containing a ferroelectric liquid crystal composition described in claim 2.

* * * * *